Figure 1:

April 24, 1934.   A. W. CARPENTER   1,955,943
EXCITER LIGHT SYSTEM
Filed Dec. 28, 1931   3 Sheets-Sheet 1

INVENTOR
Arthur W. Carpenter
BY
Harris D. Hineline
ATTORNEY

April 24, 1934.  A. W. CARPENTER  1,955,943
EXCITER LIGHT SYSTEM
Filed Dec. 28, 1931  3 Sheets-Sheet 2
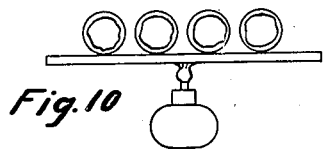
Fig.10
Fig.11
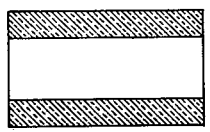
Fig.12
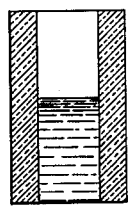
Fig.13
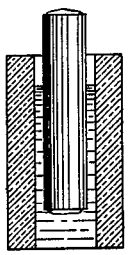
Fig.14
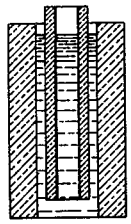
Fig.18
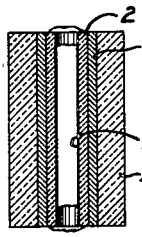
Fig.15
Fig.19
Fig.16
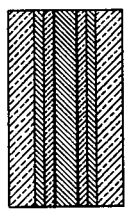
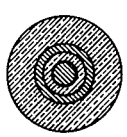
Fig.20
Fig.17
INVENTOR
Arthur W. Carpenter
BY
ATTORNEY April 24, 1934.　　A. W. CARPENTER　　1,955,943
EXCITER LIGHT SYSTEM
Filed Dec. 28, 1931　　3 Sheets-Sheet 3

INVENTOR
Arthur W. Carpenter
ATTORNEY

Patented Apr. 24, 1934

1,955,943

UNITED STATES PATENT OFFICE

1,955,943

EXCITER LIGHT SYSTEM

Arthur W. Carpenter, New York, N. Y., assignor to United Research Corporation, Long Island City, N. Y., a corporation of Delaware Application December 28, 1931, Serial No. 583,551

11 Claims. (Cl. 88—24)

This invention relates to sound recording and reproducing systems, and particularly to means for obtaining a very fine line of light upon a photographic record surface for sound translation to or from the surface.

In the operation of photographic sound record systems, an extremely narrow line of light is necessary for the translation of the sound vibrations to or from the photographic record surface, and difficulty has been encountered in obtaining a sufficiently narrow line of light, since it is desirable that the overall width of the light line be less than .001".

An object of this invention is to produce a narrow line of light upon the record surface.

Another object is to focus a reduced image of a linear light source upon a record film.

Another object is to reduce an image of a light source in successive stages for a sound translation.

Still another object is to focus a reduced image of a linear light source onto a record and reduce it in one dimension more than in another.

Another object of this invention is to remove optical irregularities in a cylindrical reflector.

Still another object is to reduce the apparent size of the linear light source in successive steps.

A still further object of this invention is to arrange a sequence of steps for the production of an optically true cylindrical reflector at a low cost.

A still further object of this invention is to avoid danger of tarnish and injury to a cylindrical reflector.

In one view of the matter this invention is an improvement over the inventions of Patents 1,552,926 and 1,578,514 to Russell Hart, wherein there is disclosed the feature of obtaining a narrow line of light by reflection from a cylindrical surface. In the prior arrangement the apparent width of an image of an incandescent filament is reduced in size by reflection from the cylindrical surface. The present invention, however, provides a much finer line of light by a second optical reduction.

The invention also provides an economical way of obtaining the light reflecting cylinder. It has been found that glass tubing of a small bore, such as quill tubing having a diameter of approximately ⅛" or less, and a wall thickness of .015" to .035", has a substantially optically true inner bore, with irregularities incident to the drawing operation concentrated upon the exterior surface. Such a bore when silvered is sufficiently true optically for reflector purposes, but the utility of this form is destroyed by the optically imperfect outer surface, and the delicacy and fragile character of the tubing. Similarly, a tube having a bore diameter of ⅛" or a little over, and an outer diameter approximately ¼" with walls ranging in thickness from .050" to .075" is commonly found to have an optically true outer surface with the irregularities incident to the drawing operation concentrated upon the inner or bore surface. Such a tube when silvered on the inside is not usable for a reflector because of the optical irregularities of the inner surface and the effect thereof upon the form of the silver layer.

However, by cementing an internally silvered, thin-walled tubing within a section of thick walled tubing by means of a cement such as Canada balsam having the same index of refraction as the glass, a cylindrical reflector having an optically true reflecting surface within an optically true outer or boundary surface is obtained. Such a structure is conveniently assembled from commercial tubing without the necessity for optical working of the surfaces. Therefore, broadly stated, the invention provides a cylindrical reflector formed of a reflecting coating within a transparent member having an optically true bore and an optically true outer surface.

Such a reflector system is useable for sound translation purposes, but the outer surface of the transparent tubing may produce secondary reflection, which must be dispensed with by the use of a mask or other means. This reflection may conveniently be avoided by providing an optically true, flat outer surface as distinguished from an optically true, curved surface. By this means the light from the source is permitted to pass through a plane surface and the reflections from the curved surface are thereby avoided. A single flat surface may be provided or a plurality of flat surfaces, one for entrance and another for exit of the light.

The cylindrical reflector may be utilized with a linear light source to produce a virtual image, having substantial length and a greatly diminished width because of the high degree of curvature of the reflector surface. The resulting virtual image may then be collected by a spherical lens system positioned between the reflector and the record surface. The focal length of the spherical lens system is desirably made quite short so that the respective foci bear a large ratio to each other with the longer focus between the spherical reflector and the lens system to give a substantial reduction in size of the image in the plane of the record film, thus subjecting the light from the linear source to two optical reductions.

By this means a high quality cylindrical reflector is obtained at a low cost; a durable easily constructed reflector is obtained; and a new combination of a plurality of optical reducing means, which may be of different types, is combined with a linear light source and a record film.

The invention thus consists of a plurality of transparent tubes, and inner reflecting surface, which may be cemented together, and of the combination of a cylindrical mirror and optical reduction system in a record reproducing system.

Figure 26:
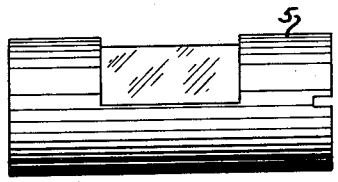
Figure 27:
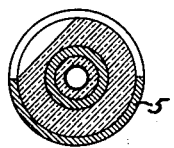
Figure 28:
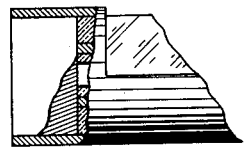
Figure 29:
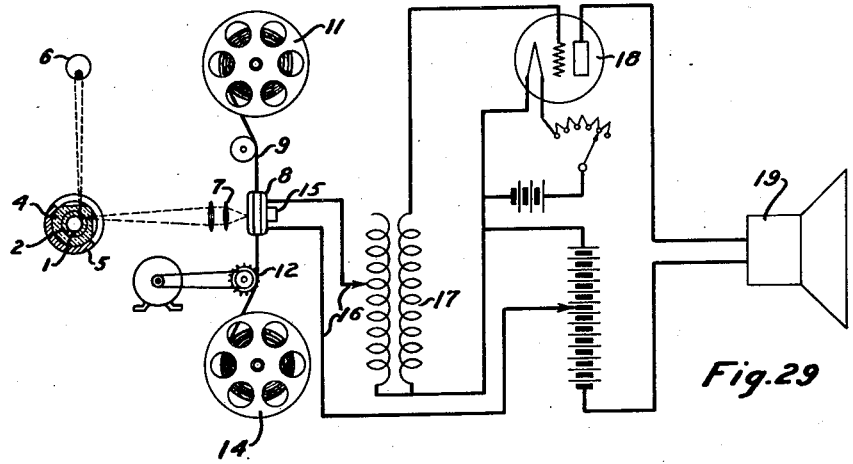
Figure 30:
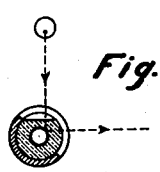
Figure 31:
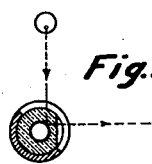

Other objects and structural details of this invention will be apparent from the following description when read in conjunction with the accompanying drawings, wherein:

Figures 1 to 17, inclusive, are views, partly in elevation and partly in section, showing successive steps in the preparation of the cylindrical reflector member of the invention;

Figures 18, 19 and 20 are views showing alternative steps for the last three of the preceding figures;

Figures 21 to 25, inclusive, are sectional views of alternative embodiments of the reflector of this invention;

Figures 26 to 28, inclusive, are views partly in section of the reflector of this invention in an appropriate mounting and protecting member;

Figure 29 is a diagrammatic representation of the reflector of this invention, together with other elements required for a sound translating system; and Figures 30 and 31 are diagrammatic representations of the light path produced by the reflector of this invention.

Figure 2:

Referring to the figures the raw stock tubing of Figure 1 may be heated in an appropriate flame and drawn down to size. The stock may be of thin walled tubing, in which case, when reduced to the desirable small size with an exterior diameter of approximately ⅛", the interior surface closely approximates to a true cylinder. Likewise, if the raw stock is of heavy walled tubing when drawn down to the desired size to produce a bore of approximately ⅛" and the exterior diameter of ¼", an exterior surface closely approximating cylindrical is produced. The condition of the raw stock after drawing is shown in Figure 2.

Figure 3:
Figure 4:
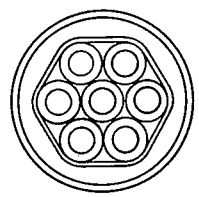
Figure 5:
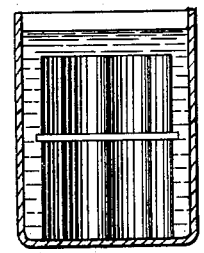
Figure 6:

Appropriate sections may be cut from the reduced portion of the tube as shown in Figure 3 a number of which may then be bundled and immersed in cleaning fluid as in Figure 4. The cleaning fluid may be nitric acid solution or may be a solution of potassium bichromate and sulphuric acid, or other appropriate chemical cleaning agents. The tube sections may then be rinsed with pure water to remove all trace of the cleaning agents.

The bundles of the small, thin walled tubing may then be submerged in an appropriate silvering solution of the type disclosed in the customary laboratory manuals. When the deposition of silver is completed and a good reflecting surface formed on the inside of the tubing, the bundle may be separated as in Fig. 6. The thin walled tubing then is silvered upon the inside and contains a considerable amount of silver upon the exterior surface.

Figure 7:
Figure 8:
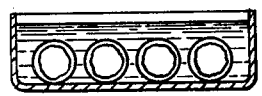
Figure 9:
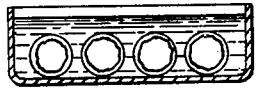

The ends of the thin walled tubing may then be plugged with wax as in Fig. 7, and the tubing submerged in nitric acid as in Fig. 8 to remove the silver from the exterior surface. The tubes may then be cleaned in distilled water as in Fig. 9, and dried on a warm plate as in Fig. 10 to yield the interiorly silvered plugged tubing of Fig. 11, in which a good optically true reflector within a thin walled tubing having a somewhat irregular exterior surface is obtained.

Thereafter a large tube having thick walls as shown in Fig. 12 may be cleaned by nitric acid or acid bichromate or other cleaning combination as in Fig. 13.

An appropriate amount of Canada balsam may then be inserted within the larger thick walled tubing of Figs. 12 and 13, and a thin walled tubing of Fig. 11 with the silvered reflector and the wax plugs in the ends may be inserted within a large tube and Canada balsam as in Fig. 14.

The balsam may then be allowed to set in order to produce the cemented reflector as in Fig. 15, after which the plugs may be removed as in Fig. 16, giving the reflector as shown in section in Fig. 17.

In Figs. 15 to 17 the silvered reflecting surface is indicated by the numeral 1. The thin walled tubing having a true bore is indicated by the numeral 2.

The cementing balsam is indicated by 3, and the outer tubing having a true cylindrical outer surface is indicated by 4.

By this construction the Canada balsam, having the same index of refraction as the glass, and being in contact with the irregularities upon the exterior surface of the inner tube and the interior surface of the outer tube, causes the irregularities to become of no effect since there is no difference in refractive index at the boundary surface between the glass and the Canada balsam and the rays of light accordingly pass through the irregular surface without the refractions.

Alternatively, the plugs in the ends of the smaller tubing may be removed before the cementing operation in which case the larger tubing is filled with Canada balsam as in Fig. 18, and the inner tubing inserted therein with the balsam filling the bore of the inner tubing and also the space between the respective tubes as in Fig. 19, and as shown in section in Fig. 20. This construction has the advantage that the silvered reflector within the smaller tube is protected on its inner surface by a layer of balsam.

The reflector may be used in a reproducing system in the form shown in Figs. 17 and 20, or, if desired, the surface of the outer tube may be ground and polished to an optical flat as shown in Figs. 21 to 25, inclusive.

Figure 21:
Figure 22:

A single flat surface may be produced upon the outer tube as shown in Fig. 21, whereby the reflector may be used in either of the two positions as shown in Figs. 30 and 31.

Figure 23:
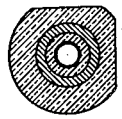
Figure 24:
Figure 25:

Alternatively, two flat surfaces at right angles may be produced upon the outer tube as in Fig. 23. This construction is the preferred form and may be utilized as shown in Fig. 29.

The use of the flat surface avoids false reflections from the exterior curved surface of the tube, and avoids the necessity for the use of restricting masks which tend to reduce the available amount of light.

The cylindrical reflector may conveniently be protected and supported by a shield as shown in Figs. 26 to 28, inclusive, in which a brass tube 5 is provided with a portion of the periphery cut out as shown and the reflector member positioned therein. The reflector may be held in place by any convenient means, such as a cement of the type of sealing wax or balsam, or it may be held in place by clamping screws or other appropriate means.

The tubular mount 5 is a convenient means by which to support and protect the reflector, and it also permits the reflector member to be mounted in a bored opening in the frame of the reproducer machine. Likewise, it permits of simple and easy adjustment of the reflector to proper position.

The reflector may be combined with a sound reproducing system as shown in Fig. 29 in which the reflecting surface 1 within the tubes 2 and 4 and the mounting cylinder 5 is positioned at the vertex of an angle between an exciter light 6 and the axis of a lens system 7.

On the other side of the lens system 7 from the reflector is provided a film guide 8 through which the film 9 is drawn from a supply reel 11 by means of a feeding sprocket 12 and rewound upon a takeup reel 14. A photocell 15 is positioned upon the reverse side of the film 9 from the lens system 7 and connected through leads 16, to a translating device such as transformer 17, an amplifier member 18, and a loud speaker or other reproducing device 19. The high curvature of the reflector 1 produces a greatly reduced virtual image of the linear filament in the exciter light 6. If a filament having a diameter of .002" or .003" is utilized, a virtual image thereof may be produced by the reflector 1 of a size less than .001" in width. The lens 7 then produces a further reduction in the image and is readily caused to focus upon the film 9 an image of the virtual image produced by reflector 1 which may have a width as small as 0.0001". At a standard linear rate of travel of 18" per second of the film 9 as 35 m/m it thus becomes possible to reproduce by a line of such dimensions, sound vibrations up to a frequency of 10,000 to 15,000 vibrations per second, and, with the film speed of 7.2" per second suitable for 16 m/m film, sound vibrations of a frequency up to 4,000 to 5,000 vibrations per second may be translated.

By the device of this invention there is thus produced a new, highly accurate and durable cylindrical reflector at a much lower cost than is possible by previous systems. There is also produced a new sound reproducing system by which is obtained a narrower line of reproducing light and a higher reproduceable frequency of vibrations than is possible by prior constructions.

While there are herewith disclosed but a limited number of embodiments of this invention, it is possible to produce still other embodiments without departure from the inventive concept herein disclosed, and it is therefore desired that only such limitations be imposed upon the appended claims as are stated therein or required by the prior art.

The invention claimed is:

1. A cylindrical reflector comprising a glass cylinder having one side thereof optically true and the other side optically untrue, a metallic reflecting surface on said optically true surface, and a coating of transparent cement on said untrue surface to render the same optically true.

2. A cylindrical reflector comprising a plurality of concentric glass tubes, the inner one thereof having a metallic reflecting surface in the bore thereof.

3. A cylindrical reflector comprising a plurality of concentric glass tubes, the inner one thereof having a true bore, the outer thereof having a true exterior surface, a transparent cement therebetween, and a metallic reflecting surface for said true bore.

4. A cylindrical reflector comprising a plurality of concentric glass tubes, the inner one thereof having a true bore, the outer thereof having a true exterior surface and a transparent cement therebetween in contact with irregular surfaces thereof and having an index of refraction approximately that of the glass tubes, and a reflecting surface in said true bore.

5. A cylindrical reflector comprising a glass tube having a true interior bore, a layer of silver in contact therewith and a flat exterior surface.

6. A cylindrical reflector comprising a plurality of transparent concentric tubes, the inner one having a true bore, and a reflecting layer in contact with said bore, the outer of said tubes having a flat surface thereon, the several tubes being cemented together.

7. A cylindrical reflector comprising a pair of transparent concentric tubes, the inner tube thereof having a true bore, a reflecting layer in contact with said bore, and a layer of cement between said tubes, said outer tube having a plurality of flat surfaces thereon.

8. In combination, an exciter lamp having a linear filament, a cylindrical reflector, a lens system and a sound record film, said reflector comprising a transparent member having an optically true silvered bore and an optically true outer surface, said outer surface comprising a flat portion.

9. In combination, an exciter lamp having a linear filament, a cylindrical reflector, a lens system and a sound record film, said reflector comprising a transparent member having an optically true silvered bore and an optically true outer surface, said outer surface comprising a plurality of flat surfaces at an angle to each other.

10. A cylindrical reflector according to claim 1 wherein a cylindrical casing surrounds and supports said glass cylinder, said casing having an opening for admitting light to and from said reflecting surface.

11. A cylindrical reflector according to claim 6 wherein a cylindrical casing surrounds and supports said tubes, said casing having an opening adjacent said flat surface.

ARTHUR W. CARPENTER.